(12) United States Patent
Agarwal (10) Patent No.: US 11,036,650 B2
(45) Date of Patent: Jun. 15, 2021

(54) SYSTEM, APPARATUS AND METHOD FOR PROCESSING REMOTE DIRECT MEMORY ACCESS OPERATIONS WITH A DEVICE-ATTACHED MEMORY

(71) Applicant: Intel Corporation, Santa Clara, CA (US)

(72) Inventor: Ishwar Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/575,478

(22) Filed: Sep. 19, 2019

(65) Prior Publication Data

US 2020/0012604 A1  Jan. 9, 2020

(51) Int. Cl.
| | | |
|---|---|---|
| G06F 12/1081 | (2016.01) | |
| G06F 9/50 | (2006.01) | |
| G06F 13/16 | (2006.01) | |
| G06F 12/0871 | (2016.01) | |
| G06F 12/0815 | (2016.01) | |
| G06F 12/0831 | (2016.01) | |
| G06F 12/0862 | (2016.01) | |

(52) U.S. Cl.
CPC ........ *G06F 12/1081* (2013.01); *G06F 9/5016* (2013.01); *G06F 12/0871* (2013.01); *G06F 13/1684* (2013.01)

(58) Field of Classification Search
CPC .... G06F 12/0837; H04L 47/40; H04L 69/162
See application file for complete search history.

(56) References Cited

U.S. PATENT DOCUMENTS

| | | | | |
|---|---|---|---|---|
| 6,119,150 | A * | 9/2000 | Fujii | G06F 12/0837 709/213 |
| 2003/0023794 | A1* | 1/2003 | Venkitakrishnan | G06F 12/0831 710/105 |
| 2003/0095559 | A1* | 5/2003 | Sano | H04L 47/40 370/419 |
| 2006/0075119 | A1* | 4/2006 | Hussain | H04L 69/162 709/227 |
| 2006/0277362 | A1* | 12/2006 | DeCenzo | G06F 11/1076 711/114 |
| 2008/0301376 | A1 | 12/2008 | Allison et al. | |

(Continued)

FOREIGN PATENT DOCUMENTS

CN    107102957 A    8/2017

OTHER PUBLICATIONS

Intel Corporation, "Compute Express Link, Specification, Mar. 2019, Revision: 1.0," Mar. 2019, 206 pages.

(Continued)

*Primary Examiner* — Getente A Yimer
(74) *Attorney, Agent, or Firm* — Trop, Pruner & Hu, P.C.

(57) ABSTRACT

In one embodiment, a processor includes: one or more cores to execute instructions; at least one cache memory; and a coherence circuit coupled to the at least one cache memory. The coherence circuit may have a direct memory access circuit to receive a write request, and based at least in part on an address of the write request, to directly send the write request to a device coupled to the processor via a first bus, to cause the device to store data of the write request to a device-attached memory. Other embodiments are described and claimed.

19 Claims, 9 Drawing Sheets

(56) References Cited

U.S. PATENT DOCUMENTS

| | | | |
|---|---|---|---|
| 2013/0191693 A1* | 7/2013 | Ross | G06F 11/0778 |
| | | | 714/45 |
| 2017/0206178 A1* | 7/2017 | Ogawa | G06F 12/0895 |
| 2018/0314638 A1 | 11/2018 | Lebeane et al. | |
| 2019/0004990 A1 | 1/2019 | Van Doren | |

OTHER PUBLICATIONS

U.S. Appl. No. 16/554,974, filed Aug. 29, 2019, entitled "Enabling Sync Header Suppression Latency Optimization in the Presence of Retimers for Serial Interconnect," by Michelle Jen.
Intel Corporation, "Intel® Data Direct I/O Technology," Accessed Sep. 9, 2019, 3 pages.
European Patent Office, European Search Report dated Nov. 30, 2020 in European patent application No. 20177013.8, 10 pages total.

* cited by examiner

FIG. 9

SYSTEM, APPARATUS AND METHOD FOR PROCESSING REMOTE DIRECT MEMORY ACCESS OPERATIONS WITH A DEVICE-ATTACHED MEMORY

TECHNICAL FIELD

Embodiments relate to communications in a computing system.

BACKGROUND

Remote direct memory access (RDMA) is a feature used in computing platforms having networked high bandwidth accelerators. A RDMA technique can be used to offload the process of DMA reads and writes over a network out of a memory buffer without the involvement of a host processor or invoking an operating system. Such technique helps to circumvent system bottlenecks by giving direct access to memory through a previously registered user space mapped address range.

When such RDMA flows are directed to a device other than the host processor such as to an accelerator device having coherent memory locally attached, complexities can arise in that oftentimes such transactions still involve the host processor. This interaction can increase latency and reduce useful bandwidth, among other issues.

DETAILED DESCRIPTION

In various embodiments, an automatic selection of whether incoming data to a host processor from a network device is to be stored according to an allocating or non-allocating flow may proceed based on address range information. For example the host processor may, based on an address range mechanism, identify incoming RDMA transactions as being directed to system memory (coupled to the host processor) or device-attached memory (coupled to an accelerator device in turn coupled to the host processor). The host processor may perform such address decoding without hints, either included in the original RDMA request from a source input/output (I/O) device, or appended to the request by a network interface card (NIC) or other intervening network circuitry. Still further as described herein, incoming Peripheral Component Interconnect Express (PCIe) transactions having relaxed ordered (RO) semantics and directed to a device-attached destination may be sent directly from the host processor to the device (for delivery to the device-attached memory) as a direct store without a prefetch operation by the host processor, which would trigger an ownership or bias flip for data of the transaction. In addition, a bias flip flow may be optimized such that it is part of a response from the device, instead of a new request from the device that would trigger additional messages.

Embodiments may be used in connection with a variety of different RDMA communications. In a particular embodiment, an accelerator device may be a graphics accelerator that may leverage graphics processing unit (GPU) direct flows as described herein. Understand that embodiments apply equally to clustered accelerators. Further, while an example embodiment described herein is in connection with a Compute Express Link (CXL) specification-based link such as in accordance with the CXL Specification version 1.1. In yet other embodiments, communication may be accordance with other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

Figure 1:
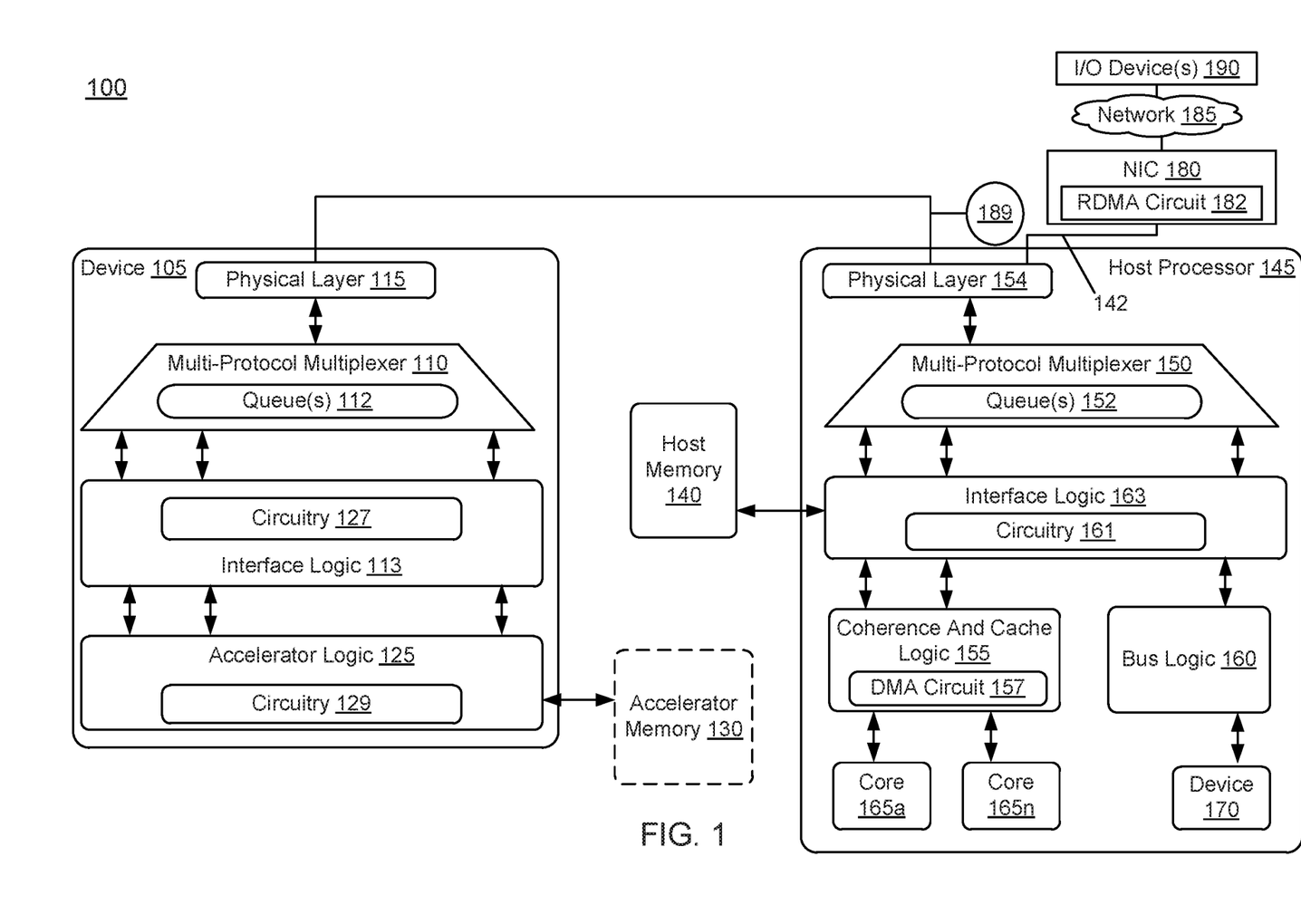
FIG. 1 is a block diagram of a system in accordance with an embodiment.

FIG. 1 is a block diagram of a system in accordance with an embodiment. In FIG. 1, a system 100 may be any type of computing device; however for purposes of illustration assume that system 100 is a server system (or portion thereof) in which various devices may be coupled in a networked arrangement. As shown one or more I/O devices 190 couple to a NIC 180, in turn coupled to a host processor 145 via a first interconnect 142. In embodiments, interconnect 142 may operate using an Ethernet-based communication protocol; of course other implementations are possible.

As illustrated, I/O devices 190 couple to NIC 180 via a network 185. Network 185 may take the form of any suitable computer network, including an internet-based network. With an arrangement herein, incoming high speed communications from I/O devices 190 may be received that may be directed to an accelerator memory 130 in turn coupled to a device 105, which may be some type of accelerator device. Such communications may be RDMA communications that may be handled with an optimized processing flow according to embodiments.

As illustrated in FIG. 1, NIC 180 includes an RDMA circuit 182. In embodiments herein, RDMA circuit 182 may be configured to receive incoming RDMA requests from one or more I/O devices 190 and direct them onto host processor 145 without performing any analysis of the request for purposes of appending TLP hints or so forth. As such, these communications may pass through NIC 180 and onto host processor 145 in an optimized manner. Furthermore, the complexity of packet processing performed in NIC 180 may be reduced.

As shown in FIG. 1 device 105 may be an accelerator or processor device coupled to host processor 145 via an interconnect 189, which may be single interconnect, bus, trace, and so forth. Device 105 and host processor 145 may communicate over link 189 to enable data and messages to pass therebetween. In some embodiments, link 189 may be operable to support multiple protocols and communication of data and messages via the multiple interconnect protocols, including a CXL protocol as described herein. For example, link 189 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 105 may include accelerator logic 125 including circuitry 129. In some instances, accelerator logic 125 and circuitry 129 may provide processing and memory capabilities. Examples of device 105 may include producer-consumer devices such as a graphics or other specialized accelerator, producer-consumer plus devices, software-assisted device memory devices, autonomous device memory devices, and giant cache devices. In some cases, accelerator logic 125 may couple to an optional accelerator memory 130. Accelerator logic 125 and circuitry 129 may provide the processing and memory capabilities based on the device such as graphics functionality. For example, accelerator logic 125 and circuitry 129 may communicate using, for example, a coherent interconnect protocol for various functions, such as coherent requests and memory flows with host processor 145 via interface logic 113 and circuitry 127. Interface logic 113 and circuitry 127 may determine an interconnect protocol based on the messages and data for communication.

In addition, circuitry 127 may be configured to handle incoming RDMA requests in an optimized manner. For example, where such incoming RDMA write requests are directed to accelerator memory 130, circuitry 127 may be configured to perform direct writes into accelerator memory 130, without the need for updating a bias for one more cache lines associated with the write request from a device bias to a host bias, as described further herein. Still further, circuitry 127 may be configured, in response to an incoming memory invalidation request from host processor 145, to issue a use once response that informs host processor 145 that device 105 is to desirably use data associated with the memory invalidation request in the near future, such that host processor 145 uses the data once and then relinquishes ownership of the data to device 105, as described further herein. In some embodiments, interface logic 113 may be coupled to a multi-protocol multiplexer 110 having one or more protocol queues 112 to send and receive messages and data with host processor 145. Protocol queue 112 may be protocol specific such that each interconnect protocol may be associated with a particular protocol queue. Multiplexer 110 may also implement arbitration circuitry to arbitrate between communications of different protocols and provide selected communications to a physical layer 115.

In various embodiments, host processor 145 may be a main processor such as a CPU. Host processor 145 may be coupled to a host memory 140 and may include coherence logic (or coherence and cache logic) 155, which may include a cache hierarchy. Coherence logic 155 may communicate using various interconnects with interface logic 163 including circuitry 161 and one or more cores 165*a-n*. In some embodiments, coherence logic 155 may enable communication via one or more of a coherent interconnect protocol and a memory interconnect protocol. As further illustrated, coherence logic 155 may include a DMA circuit 157. In embodiments herein, DMA circuit 157 may be configured to automatically select between allocating and non-allocating flows for handling incoming write requests, e.g., RDMA write requests, based on an address range decode. Such automatic selection may occur without hint information being provided, either by I/O device 190 or NIC 180. In addition, when incoming requests such as incoming PCIe requests have relaxed ordering semantics, DMA circuit 157 may send direct stores to device 105 for storage in accelerator memory 130, without performing a prefetch operation to obtain ownership. In this way, embodiments may avoid a bias flip from device bias to host bias for data of such incoming write requests, optimizing processing flow and reducing traffic between host processor 145 and device 105.

In various embodiments, host processor 140 may include a device 170 to communicate with a bus logic 160 over an interconnect. In some embodiments, device 170 may be an I/O device, such as a PCIe I/O device. In other cases, one or more external devices such as PCIe devices (which may be one or more of I/O devices 190) may couple to bus logic 170.

In embodiments, host processor 145 may include interface logic 163 and circuitry 161 to enable multi-protocol communication between the components of host processor 145 and device 105. Interface logic 163 and circuitry 161 may process and enable communication of messages and data between host processor 145 and device 105 in accordance with one or more interconnect protocols, e.g., a non-coherent interconnect protocol, a coherent interconnect, protocol, and a memory interconnect protocol, dynamically. For example, interface logic 163 and circuitry 161 may determine a message type for each message and determine which interconnect protocol of a plurality of interconnect protocols to process each of the messages. Different interconnect protocols may be utilized to process the messages.

In some embodiments, interface logic 163 may be coupled to a multi-protocol multiplexer 150 having one or more protocol queues 152 to send and receive messages and data with device 105. Protocol queue 152 may be protocol specific such that each interconnect protocol may be associated with a particular protocol queue. Multiplexer 150 may also implement arbitration circuitry to arbitrate between communications of different protocols and provide selected communications to a physical layer 154.

Figure 2:
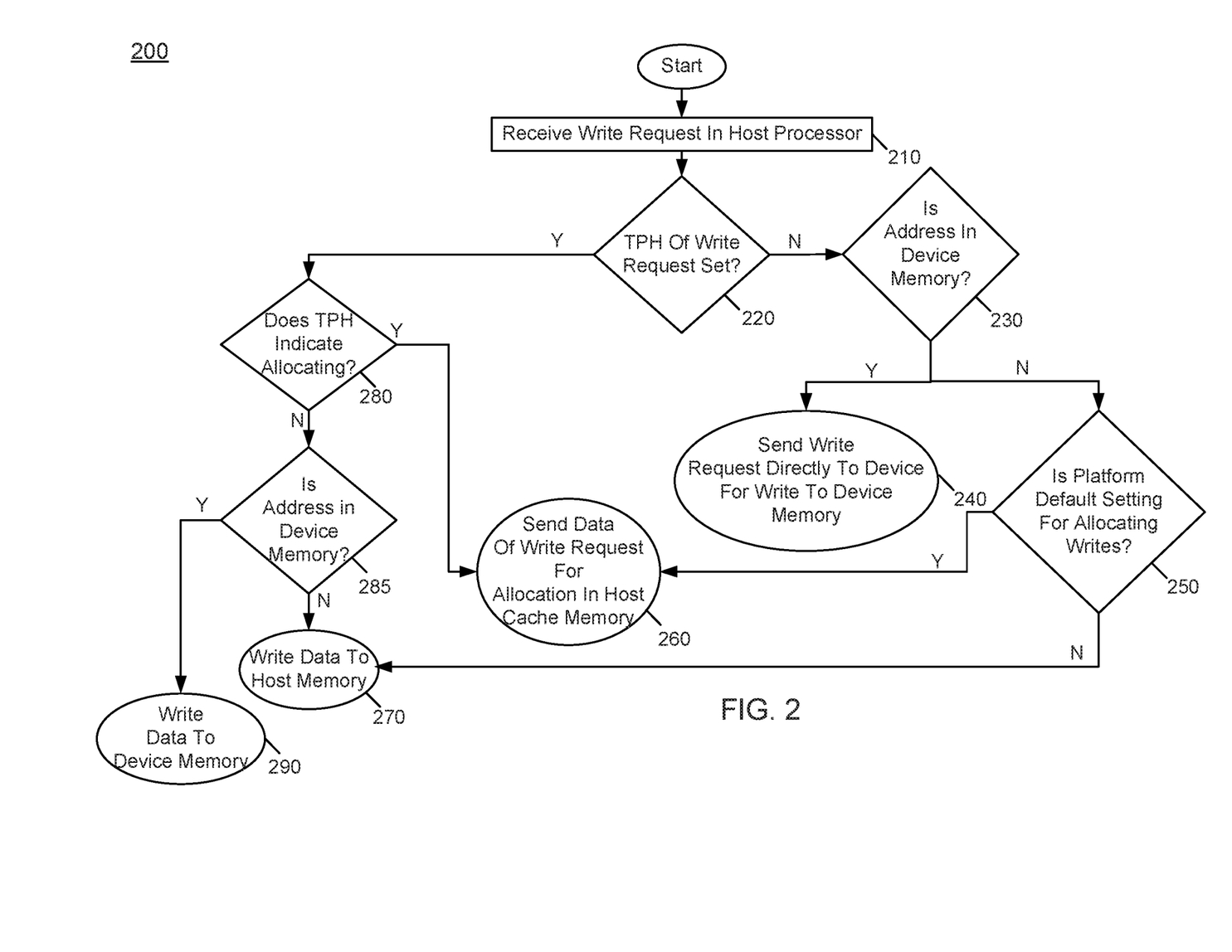
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 is a method for routing an incoming write request to an appropriate destination. Method 200 may be performed by circuitry within a host processor, such as coherence circuitry that receives the incoming write requests. As such, method 200 may be performed by hardware circuitry, firmware, software and/or combinations thereof.

As illustrated, method 200 begins by receiving a write request in the host processor (block 210). In an embodiment this request may be received within coherence circuitry. Assume that this write request is incoming from a NIC that in turn received the write request from a networked device, such as an I/O device. In any event, it is determined at diamond 220 whether this write request has a set transaction layer processing (TLP) processing hint (TPH). Typically, the NIC would apply this TPH as part of the network processing. However with embodiments herein, the NIC overhead of determining an appropriate destination and applying a TPH can be avoided.

Thus as illustrated, in typical use cases, control passes from diamond 220 to diamond 230 where it is determined whether an address of the incoming write request is within device memory. In an embodiment, this determination may be based on information present in one or more address range decoders of the coherence circuitry. If it is determined that the address is located in device memory, control passes to block 240 where the write request can be directly sent to the device for writing into the device memory. In an embodiment, this write request may be communicated to the device via a CXL bus.

Still with reference to FIG. 2, otherwise if it is determined that the address is not in device memory, control passes to diamond 250 to determine whether a platform default setting is for allocating or non-allocating writes. That is for an allocating setting, data of the write request is allocated directly into a cache memory of the host processor, such as a last level cache (LLC). One example of such an allocating write arrangement may be implemented using an Intel® Direct Data Input/Output (DDIO) technique. With this or similar technique, incoming write requests are directly written into the host LLC, avoiding the overhead of writing such data out to memory. This operation may proceed, as it is presumed that such data will likely be accessed within the host processor in the near future. In contrast for a non-allocating setting, data of the write request may be written into host memory.

If it is determined that the platform default setting is for allocating writes, control passes to block 260 where the data of the write request may be allocated into a host cache memory, e.g., the LLC. Otherwise, control passes to block 270 where data of the write request is sent to host memory for storage.

Still with reference to FIG. 2, if it is determined that the TPH of the incoming write request is set, control passes to diamond 280 where it is determined whether the TPH indicates an allocating transaction. If so, control passes to block 260 where the data is stored in host cache memory. Otherwise, control passes to diamond 285 where it is determined whether the address is in device memory. If so, the data is written to device memory at block 290. Otherwise, control passes to block 270 where the data is written to host memory. Understand while shown at this high level in the embodiment of FIG. 2, many variations and alternatives are possible.

With embodiments having automatic selection of destination of incoming RDMA transactions, improved performance may be realized. Instead without an embodiment, typical server platforms that implement Intel® DDIO or similar technique would cause DMA writes to be stored into internal cache memory of the host processor. While this works well if the consumer of the data is in a processor core, it is sub-optimal if the consumer of the data is an accelerator device. In such cases, the ideal location for DMA write data is the device-attached memory itself. In theory, a NIC may be able to control where data is written using PCIe TPH. However, since the NIC does not operate on host physical addresses and further does not contain a system address map, it has no way of differentiating different writes without considerable overhead. Thus with an embodiment, there is no need for a NIC or other hardware to make a runtime decision on DMA data location (e.g., based on work descriptors). Embodiments instead enable automatic selection without any hint information in the incoming transactions. Instead without automatic selection, to determine whether a PCIe write allocates to cache memory (allocating) or memory (non-allocating) requires a hint, e.g., a TPH bit that is sent on a transaction-by-transaction basis. Note that the host processor may choose to honor or ignore this hint. If no hint is sent, the host processor processes the transaction based on a platform default setting, which can either be allocating or non-allocating. With an embodiment, there is no need for setting the TPH bit or other hint. And, even in a platform having an allocating default policy, RDMA transactions may be directly written to device-attached memory, which is optimal.

Figure 3:
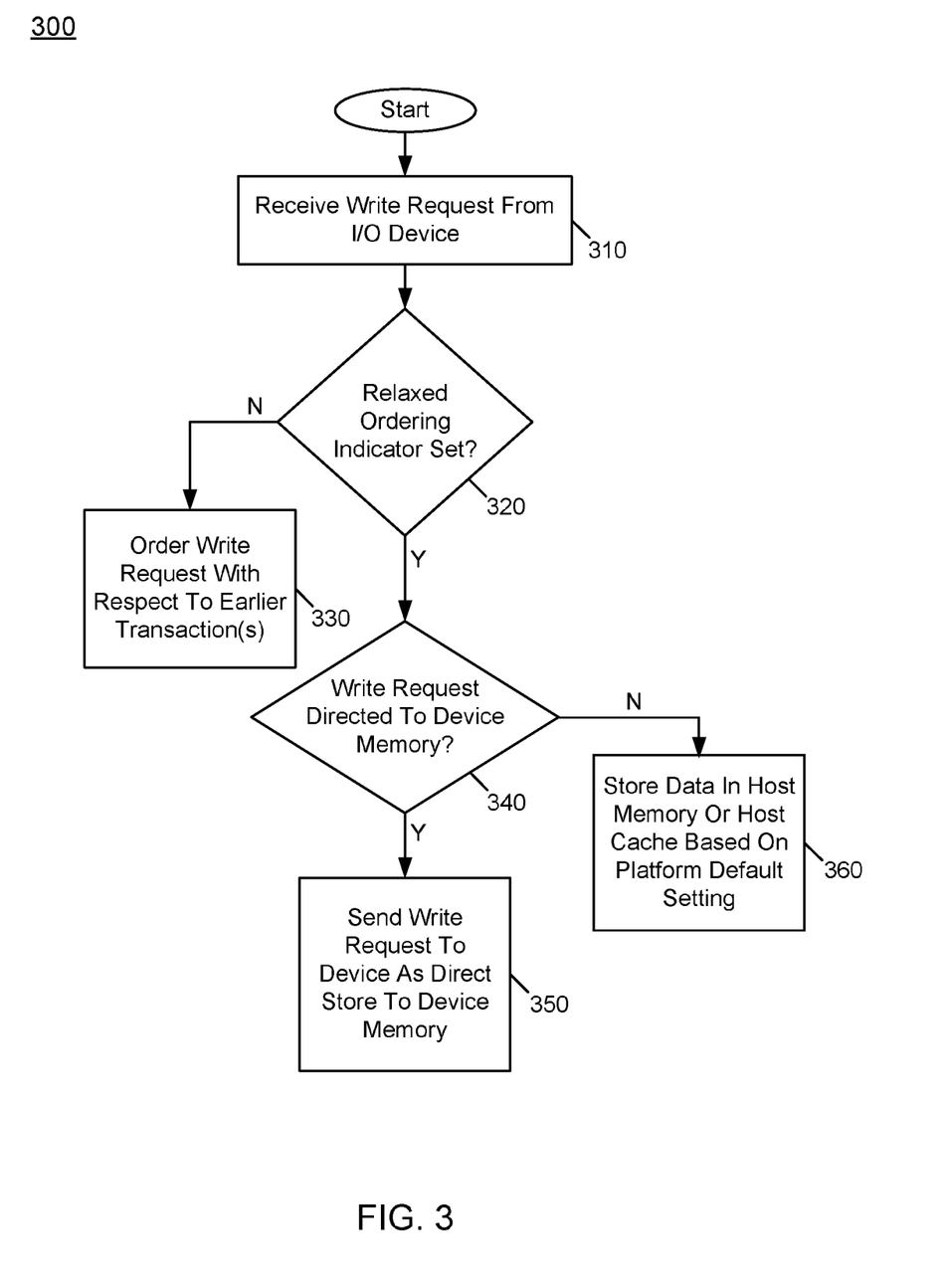
FIG. 3 is a flow diagram of a method in accordance with another embodiment of the present invention.

Referring now to FIG. 3, shown is a flow diagram of a method in accordance with another embodiment of the present invention. As shown in FIG. 3, method 300 is a method for routing an incoming write request having relaxed ordering. Method 300 may be performed by circuitry within a host processor, such as coherence circuitry. As such, method 300 may be performed by hardware circuitry, firmware, software and/or combinations thereof. As shown in FIG. 3, method 300 begins by receiving a write request from an I/O device (block 310). As described above, such request may be received by coherence circuitry of the host processor. Next it may be determined at diamond 320 whether a relaxed ordering indicator of the write request is set. If not, this write request is to be handled in an ordered manner. As such, control passes to block 330 where the write request may be ordered with respect to earlier transactions. In this way, the processor ensures that this write request is not completed until previous memory requests have first been performed.

Still referring to FIG. 3, instead if it is determined that the relaxed ordering indicator is set, control passes to block 340 where it is determined whether the write request is directed to device memory. In an embodiment, an address decoder may be accessed to determine the destination of the write request. If directed to device memory, at block 350 the write request is sent to a device as a direct store to device memory, avoiding the need for first performing a host prefetch for ownership of the line to which this data is to be stored. As a result, a simplified transaction flow is realized for incoming write requests that are directed to a device memory. Still further, the device itself also benefits, as it is not impacted by blocking entries as a result of a loss of device bias for this data due to the host prefetch and ownership of the line, which would otherwise occur. As a result, improved efficiency of incoming device write requests is realized.

Still with reference to FIG. 3, if it is determined that the request is not directed to device memory (namely it is directed to a location within host memory), control passes to block 360 where the data may be stored in the appropriate location. More specifically, depending upon whether the platform default setting is for allocating or non-allocating writes, the data may be stored in host cache memory (in case of an allocating default setting) or host memory (in case of a non-allocating default setting). Understand while shown at this high level in the embodiment of FIG. 3, many variations and alternatives are possible.

As described above, with a host processor prefetch for ownership of a line and consequent loss of device bias, undesirable effects such as blocking entries may occur within the device until it can flip the bias back to device bias. With an embodiment as in FIG. 3, for PCIe traffic with a set relaxed ordered indicator, the host processor skips prefetch, which leads to a direct store to the device memory. And with no prefetch, the device does not transition the line from device to host bias. Embodiments may thus save communication of a number of messages, leading to more efficient transfer across a physical interface. Such operation may be ideal for large data transfers (e.g., bulk transfers) from I/O device to device memory.

Figure 4:
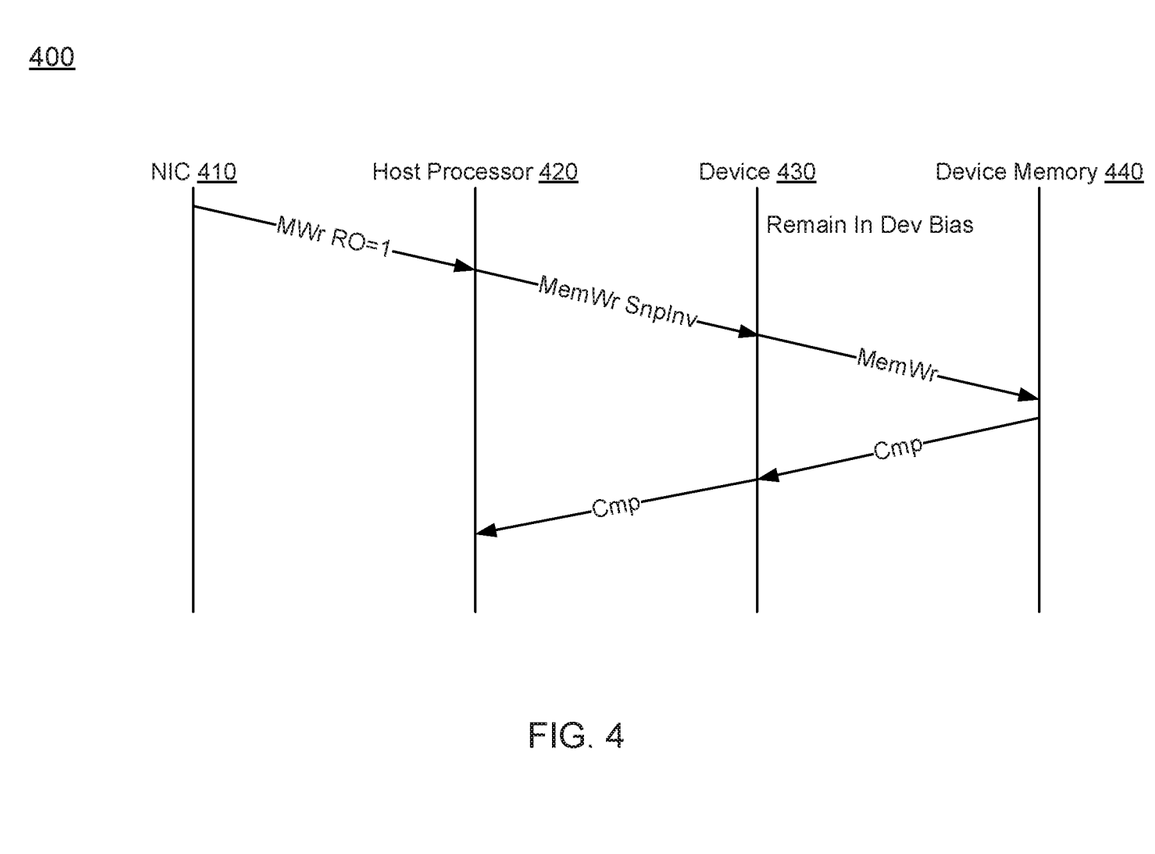
FIG. 4 is a timing diagram illustrating operation of a direct store operation in accordance with an embodiment of the present invention.

Referring now to FIG. 4, shown is a timing diagram illustrating operation of a direct store operation in accordance with an embodiment of the present invention. As shown in FIG. 4 in a computing system 400 such as server platform, an incoming memory write request may be received in a NIC 410. NIC 410 forwards this memory request, which has a set relaxed ordering indicator, to a host processor 420. Processor 420 may be a multicore processor or other SoC. Assume that this write transaction targets a device memory 440 coupled to a device 430, which may be an accelerator device coupled to host processor 420 via a CXL bus.

With embodiments herein, host processor 420 may directly forward this memory write request to device 430 without performing a prefetch process, leading to a direct store to device memory 440 by device 430. Note that this direct store is issued in connection with a snoop invalidate message to maintain coherency. This is so, since in this flow host processor 420 issues the direct store without first performing a prefetch process. This snoop invalidate message may be used to cause the device to snoop its caches and merge any corresponding data with the data received from host processor 420. In this way, there is reduced messaging between host processor 420 and device 430. After the data has been written to the requested location in device memory 440, a completion is sent back to host processor 420 via device 430.

With a flow as in FIG. 4, device coherency management is eased. That is, in embodiments, incoming RDMA transactions directed to device-attached memory may proceed directly to the device (via the host processor) without the host processor obtaining ownership of data of the transactions. Instead without an embodiment when a PCIe device sends a write request targeting device-attached memory, to maintain coherence the host processor first acquires ownership of the line. Such operation incurs a bias flip in the device for the page, from device bias to host bias. Thus without an embodiment before the device can consume the data that was written to at this page, it would require an update of bias to device bias. This is sub-optimal for performance since it leads to pipeline delays at the device. And with embodiments, instead of a device sending a separate dedicated request to the host processor to flip the line back to device bias, which consumes bandwidth and latency, the device may issue the request as a response to a write message from the host processor.

Figure 5:
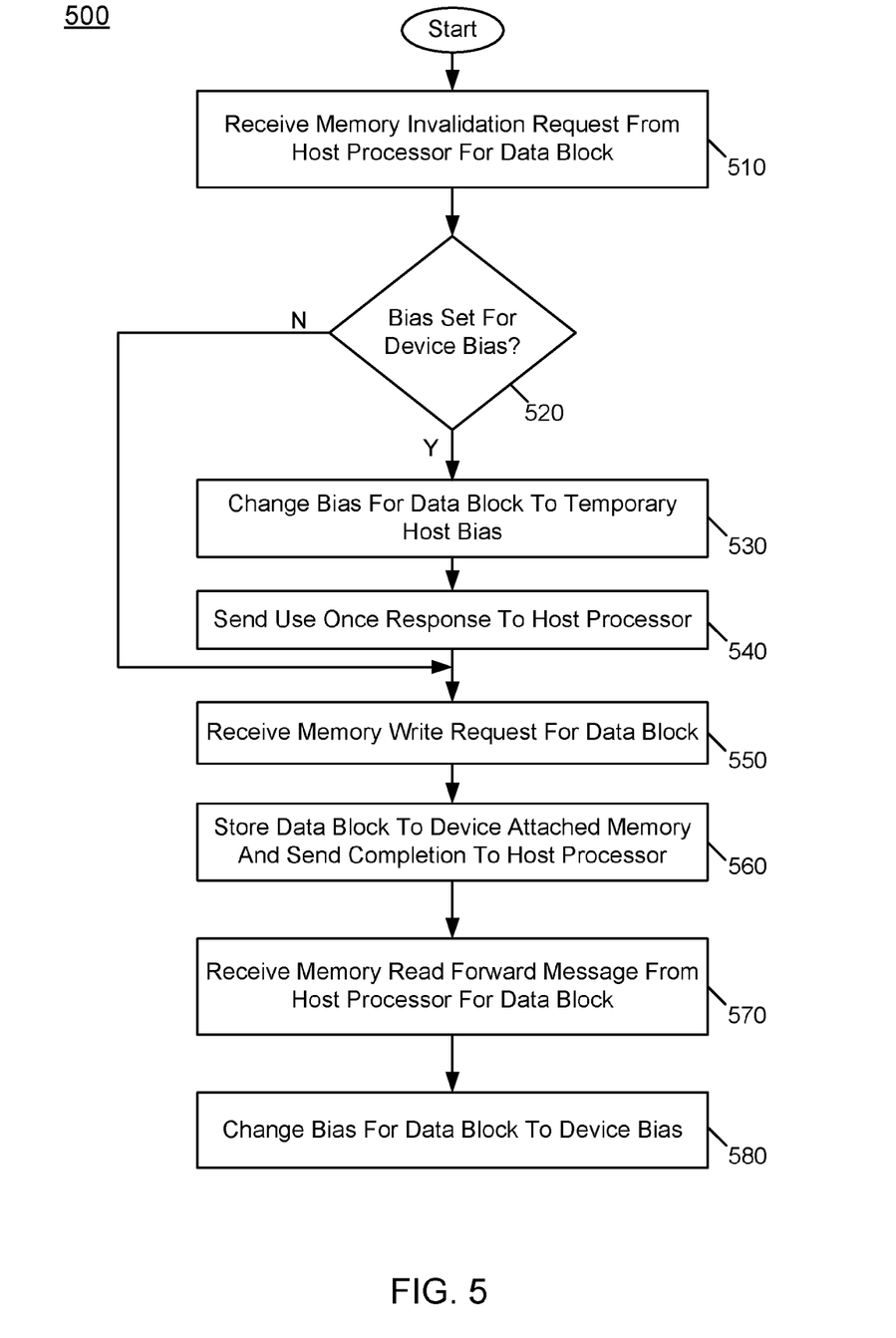
FIG. 5 is a flow diagram of a method in accordance with another embodiment of the present invention.

Referring now to FIG. 5, shown is a flow diagram of a method in accordance with another embodiment of the present invention. More specifically, method 500 of FIG. 5 is a method for performing a bias flip operation in an optimized manner. In embodiments herein, method 500 may be performed at least in part by circuitry within an accelerator device such as coupled to a host processor via a CXL bus and having a device-attached memory. As such method 500 may be performed by hardware circuitry, firmware, software and/or combinations thereof.

As illustrated, method 500 begins by receiving a memory invalidation request from a host processor within the device (block 510). More specifically, this memory invalidation request may be a request from the host processor for the device to invalidate a data block that comprises a cache line of data that the host processor seeks to use. In implementations herein, understand that this cache line may be the subject of an incoming write request such as an RDMA request from a remote device coupled to the host processor. In response to this memory invalidation request, control next passes to diamond 520 to determine whether a bias for this cache line is set for a device bias. Note that such bias status may be stored in a coherency structure within the device (e.g., within circuitry 127 in device 105 of FIG. 1) that stores, for each data block (which may be in cache line granularity, page granularity or even higher) in device-attached memory a bias indicator to indicate whether the corresponding data block is owned by the device or by the host.

If it is determined at diamond 520 that the bias is currently set for device bias, control passes to block 530 where the bias may be changed. More specifically, the device may update the bias for this data block to set it to temporary host bias so that the data block can be used by the host processor. In an embodiment, this temporary host bias may be indicated by adding an entry to a blocking structure for the data block (e.g., cache line). This blocking structure may include entries to identify cache lines acquired by the host processor. Stored entries correspond to cache lines within the device-attached memory that have a host bias. Such blocking entries may remain in place until the device has successfully flipped the bias of that cache line back to device bias. Note that a blocking entry prevents any device-initiated request to that address from making forward progress to ensure coherency. Entries in this blocking structure thus may be used to identify a temporary host bias.

Still with reference to FIG. 5, next control passes to block 540 where the device may send a use once response to the host processor. In an embodiment, the device may send a completion message having a use once indicator to indicate to the host processor that it is allowed to use the data only once and thereafter to return the data to the device. Understand that in response to this use once indicator of the completion message, the host processor may set a status for the data block to a use once status such that the host processor may use the data once, e.g., to update the data block and thereafter to return the data block to the device.

Thus as further illustrated in FIG. 5, control next passes to block 550 where at a later time (after the single use by the host processor) a memory write request is received in the device for this data block. In response to this memory write request, the device may cause the device-attached memory to store the data block (block 560). Also in response to this storage of the data block, a completion may be sent back to the host processor to indicate successful storage.

Still referring to FIG. 5, in response to this completion, the host processor may send a memory read forward message that is received in the device for the data block (block 570). Finally, at block 580 in response to this memory read forward message, the device may change the bias for this data block to device bias. Understand while shown at this high level in the embodiment of FIG. 5, many variations and alternatives are possible.

With an embodiment as in FIG. 5, a more optimized handling of a bias flip occurs, with reduced message traffic with reduced latency such that the device gains faster ownership of the data block. Note that the use once semantic response causes the host processor to self-invalidate the line once it has used it once and written it back to the device, thus allowing the device to retain the line in device bias. Such lines may be located in pages in device memory for which the device wants to retain device bias. These are typically the buffers that the PCIe device is producing into that the accelerator device intends to consume.

Figure 6:
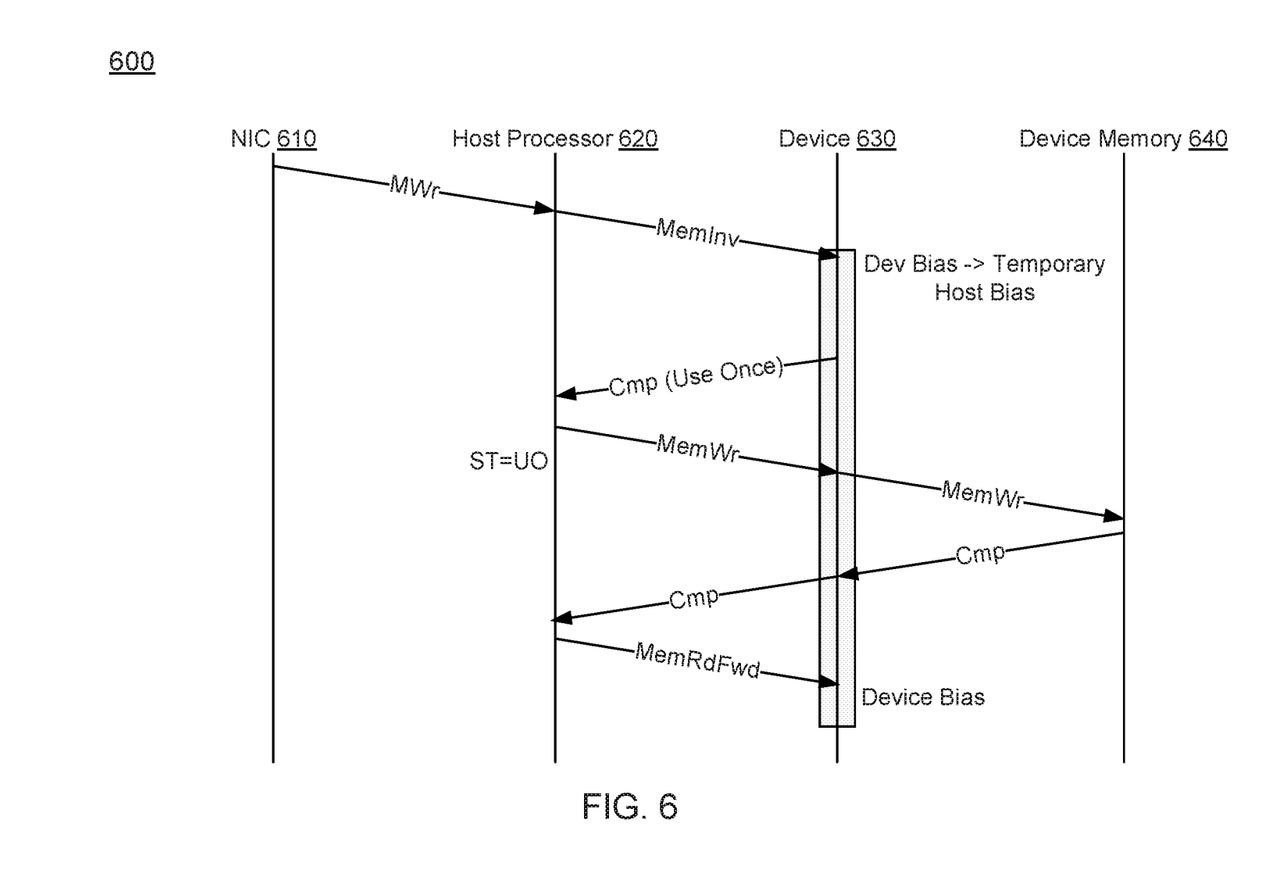
FIG. 6 is a timing diagram illustrating operation of a bias flip operation in accordance with another embodiment of the present invention.

Referring now to FIG. 6, shown is a timing diagram illustrating operation of a ordered store operation in accordance with another embodiment of the present invention. As shown in FIG. 6 in a computing system 600, which may be a server platform configured similarly as platform 400 of FIG. 4, an incoming memory write request may be received in a NIC 610. NIC 610 forwards this memory request, which does not have a set relaxed ordering indicator, to a host processor 620. Instead assume that this write transaction is strongly ordered, such as a flag write operation to indicate that a plurality of prior RDMA write operations have completed. This flag may set to indicate to a device 630 that data of prior bulk RDMA writes into a device-attached memory 640 may be consumed. As a strongly ordered write, host processor 620 may ensure that all preceding writes have made it to device-attached memory 640 before setting the flag.

In this example, host processor 620 may perform a prefetch process by issuing a memory invalidation request to device 630. However in an embodiment, device 630 may respond to this memory invalidation request with a special command, namely a use once command. This command grants a time-limited permission for the host processor to use the data only once and then provide the data for storage in device memory 640.

As further shown in FIG. 6, after host processor 620 uses this data once, it sends a memory write request to device 630, leading to a store of the data (possibly updated by host processor 620) to device memory 640 by device 630. After the data has been written to the requested location in device memory 640, a completion is sent back to host processor 620 via device 630. In turn, this completion causes host processor 620 to release the temporary host bias by sending a memory read forward message. As seen, this message causes device 630 to update bias back to device bias.

Thus with embodiments, DMA transactions from a PCIe device to an accelerator device may result in a selective non-allocating flow without hints on the incoming transactions. And, DMA transactions from a PCIe device to the accelerator device may occur without causing a bias flip.

Figure 7:
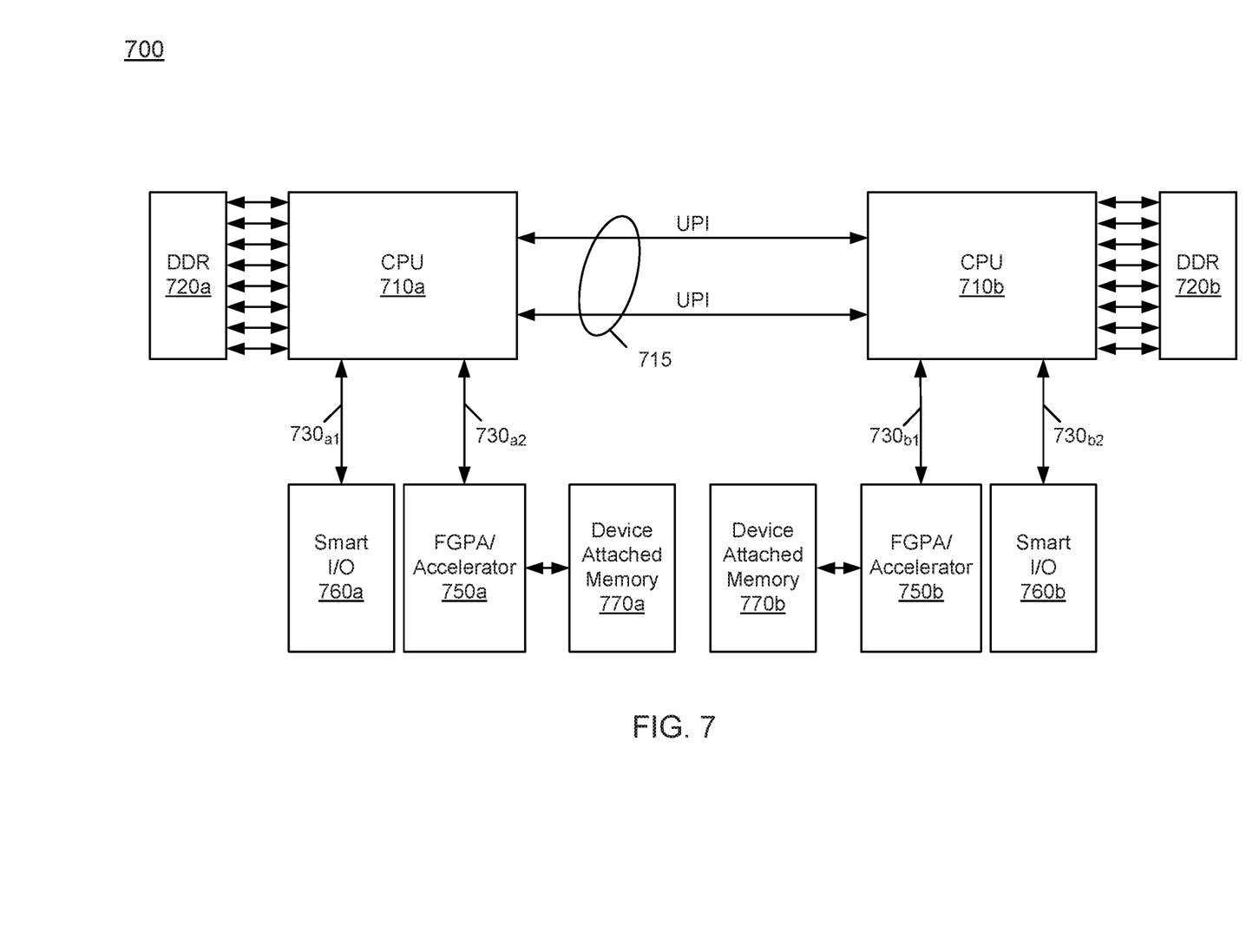
FIG. 7 is a block diagram of a system in accordance with another embodiment of the present invention.

Referring now to FIG. 7, shown is a block diagram of a system in accordance with another embodiment of the present invention. As shown in FIG. 7, a system 700 may be any type of computing device, and in one embodiment may be a server system. In the embodiment of FIG. 7, system 700 includes multiple CPUs 710*a,b* that in turn couple to respective system memories 720*a,b* which in embodiments may be implemented as double data rate (DDR) memory. Note that CPU 710 may couple together via an interconnect system 715 such as an Intel® Ultra Path Interconnect or other processor interconnect technology.

To enable coherent accelerator devices and/or smart input/output (IO) devices to couple to CPUs 710 by way of potentially multiple communication protocols, a plurality of interconnects 730*a*1-*b*2 may be present. In an embodiment, each interconnect 730 may be a given instance of a CXL bus to enable RDMA communications to occur in an optimized manner as described herein.

In the embodiment shown, respective CPUs 710 couple to corresponding field programmable gate arrays (FPGAs)/accelerator devices 750*a,b* and smart I/O devices 760*a,b*. As further illustrated in FIG. 7, device-attached memories 770*a,b* may couple to FPGA/accelerator devices 750. With an arrangement as in FIG. 7, CPUs 710 may perform direct writes of incoming RDMA write requests into device-attached memories 770 using the techniques described herein, and without the benefit of hint information provided in the incoming requests.

Figure 8:
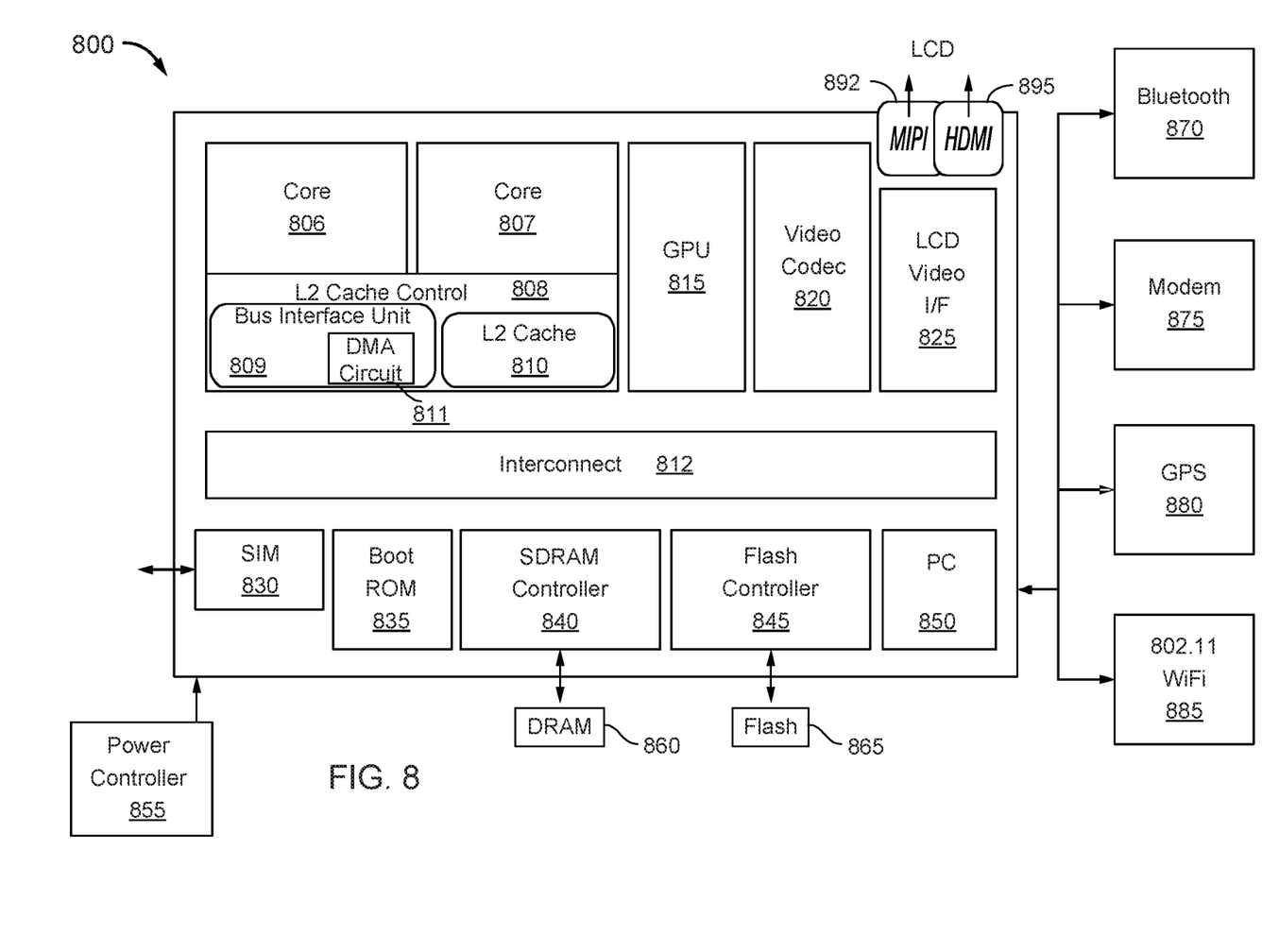
FIG. 8 is a block diagram of an embodiment of a SoC design in accordance with an embodiment.

Turning next to FIG. 8, an embodiment of a SoC design in accordance with an embodiment is depicted. As a specific illustrative example, SoC 800 may be configured for insertion in any type of computing device, ranging from portable device to server system. Here, SoC 800 includes 2 cores 806 and 807. Cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache controller 808 that is associated with bus interface unit 809 and L2 cache 810 to communicate with other parts of system 800 via an interconnect 812. As seen, bus interface unit 809 includes a DMA circuit 811 configured to optimize incoming RDMA write requests (even in the absence of associated hint information) such that they may be directly forwarded to an external device-attached memory (not shown in FIG. 8), without seeking a prefetch or otherwise obtaining ownership of data of the requests, as described herein.

Interconnect 812 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g., DRAM 860), a flash controller 845 to interface with non-volatile memory (e.g., flash 865), a peripheral controller 850 (e.g., an eSPI interface) to interface with peripherals, video codec 820 and video interface 825 to display and receive input (e.g., touch enabled input), GPU 815 to perform graphics related computations, etc. In addition, the system illustrates peripherals for communication, such as a Bluetooth module 870, 3G modem 875, GPS 880, and WiFi 885. Also included in the system is a power controller 855. Further illustrated in FIG. 8, system 800 may additional include interfaces including a MIPI interface 892, e.g., to a display and/or an HDMI interface 895 also which may couple to the same or a different display.

Figure 9:
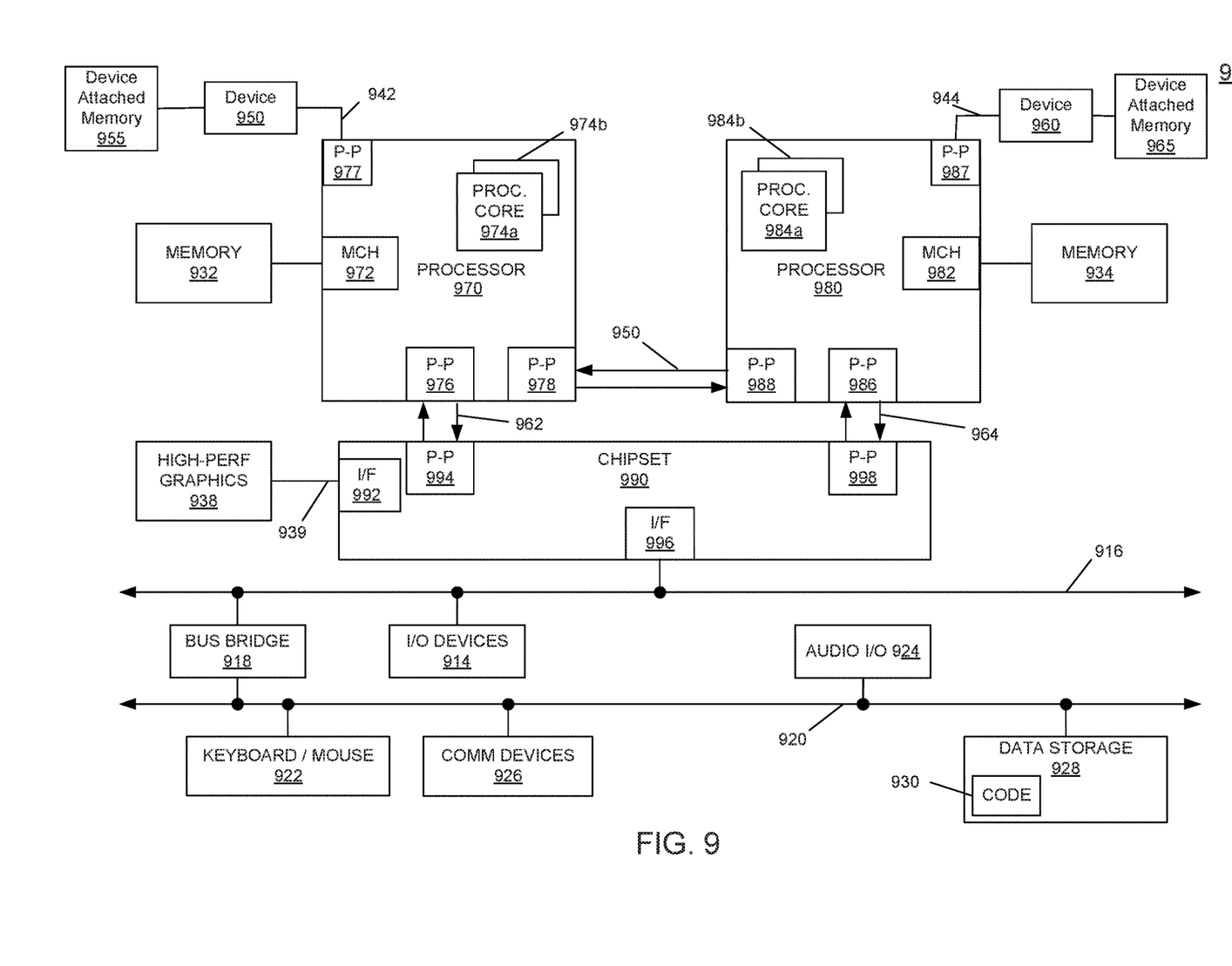
FIG. 9 is a block diagram of a system in accordance with another embodiment of the present invention.

Referring now to FIG. 9, shown is a block diagram of a system in accordance with an embodiment of the present invention. As shown in FIG. 9, multiprocessor system 900 includes a first processor 970 and a second processor 980 coupled via a point-to-point interconnect 950. As shown in FIG. 9, each of processors 970 and 980 may be many core processors including representative first and second processor cores (i.e., processor cores 974*a* and 974*b* and processor cores 984*a* and 984*b*).

In the embodiment of FIG. 9, processors 970 and 980 further include point-to point interconnects 977 and 987, which couple via interconnects 942 and 944 (which may be CXL buses) to accelerator devices 950 and 960 (respectively coupled to device-attached memories 955 and 965). In this way, processors 970 and 980 may optimize incoming RDMA write request handling by directly forwarding such requests to device-attached memories 955 and 965, without seeking a prefetch or otherwise obtaining ownership of data of the requests, as described herein.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCH's 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 976 and 986, respectively. As shown in FIG. 9, chipset 990 includes P-P interfaces 994 and 998.

Furthermore, chipset 990 includes an interface 992 to couple chipset 990 with a high performance graphics engine 938, by a P-P interconnect 939. As shown in FIG. 9, various input/output (I/O) devices 914 may be coupled to first bus 916, along with a bus bridge 918 which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. In an embodiment, one such communication device may be a NIC that can receive incoming RDMA write requests from one or more I/O devices 914 and direct along to one of processors 970 and 980 without performing the overhead of analyzing the request to determine destination and applying a TPH or other hint information, as described herein. Further, an audio I/O 924 may be coupled to second bus 920.

The following examples pertain to further embodiments.

In one example, a processor includes: one or more cores to execute instructions; at least one cache memory; and a coherence circuit coupled to the at least one cache memory, the coherence circuit having a DMA circuit to receive a write request from a NIC, and based at least in part on an address of the write request, to directly send the write request to a device coupled to the processor via a first bus, to cause the device to store data of the write request to a device-attached memory.

In an example, the coherence circuit comprises an address range decoder, and the DMA circuit is to access the address range decoder using the address of the write request to determine that the write request is directed to the device-attached memory.

In an example, when the write request has a set relaxed ordering indicator, the DMA circuit is to directly send the write request to the device without a prefetch operation.

In an example, the write request comprises a remote direct memory access request having an unset transaction layer processing hint.

In an example, in response to a determination that the address of the write request is directed to a system memory coupled to the processor, the DMA circuit is to store the data of the write request in the at least one cache memory.

In an example, the DMA circuit is to store the data of the write request in the at least one cache memory further in response to an allocating platform default setting.

In an example, the coherence circuit, in response to a use once indicator from the device for a second data, is to cause the processor to use the second data one time, and thereafter send a second write request comprising the second data to the device.

In an example, in response to a completion from the device for the second write request, the processor is to send a forward message to the device to cause the device to change a bias of the second data to a device bias.

In an example, the coherence circuit, in response to a third write request having an unset relaxed ordering indicator, is to order the third write request after one or more prior write requests.

In another example, a method comprises: receiving, in a control circuit of a device coupled to a host processor via a first bus, an invalidation request for a first data block from the host processor; in response to the invalidation request, updating a bias for the first data block from a device bias to a temporary host bias; and thereafter sending a completion message to the host processor comprising a use once indicator to cause the host processor to use the first data block one time and then to relinquish ownership of the first data block to the device.

In an example, the method further comprises: receiving, in the device, a write request for the first data block; in response to the write request, storing the first data block in a device-attached memory; and sending a second completion message to the host processor.

In an example, after sending the second completion message to the host processor, receiving a forward message from the host processor and in response to the forward message, updating the bias for the first data block to the device bias.

In an example, the method further comprises updating the bias for the first data block to the device bias without issuing a request for ownership to the host processor.

In an example, the method further comprises: receiving, in the control circuit of the device, a second write request for a second data block, the second write request comprising a direct write request; and in response to the second write request, storing the second data block in the device-attached memory.

In an example, the first data block comprises remote direct memory access data from a first input/output device coupled to the device via the host processor and a network interface controller.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a host processor having at least one core, at least one cache memory and a coherence circuit coupled to the at least one cache memory, where the coherence circuit comprises a DMA circuit to receive a RDMA write request, and based at least in part on an address of the RDMA write request, to directly send the RDMA write request to a device, where the RDMA write request has a relaxed ordering indicator associated therewith; the device coupled to the host processor via a first bus, where in response to the RDMA write request, the device is to store data of the RDMA write request to a device-attached memory and to set a bias of the data to a device bias; and the device-attached memory locally coupled to the device.

In an example, the coherence circuit comprises an address range decoder, and the DMA circuit is to access the address range decoder using the address of the RDMA write request to determine that the write request is directed to the device-attached memory, where the system comprises a server platform having an allocating default setting.

In an example, in response to a second write request directed to a host memory coupled to the host processor, the host processor is to store second data of the second write request to the least one cache memory based on the allocating default setting.

In an example, in response to a second RDMA write request directed to the device-attached memory, the host processor is to send an invalidation message to the device, and in response to the invalidation message, the device is to send a use once response to the host processor to grant a temporary host bias for the second data.

In an example, the host processor, in response to the use once response, is to use second data of the second RDMA write request one time, and thereafter send a write request to the device to cause the device to store the second data in the device-attached memory, and thereafter the host processor is to perform a self-invalidation of the second data to relinquish the temporary host bias.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   one or more cores to execute instructions;
   at least one cache memory; and
   a coherence circuit coupled to the at least one cache memory, the coherence circuit having a direct memory access (DMA) circuit to receive a write request from a network interface card (NIC), and based at least in part on an address of the write request, to directly send the write request to a device coupled to the processor via a first bus and not to a system memory coupled to the processor, to cause the device to store data of the write request to a device-attached memory locally coupled to the device, wherein when the write request has a set relaxed ordering indicator, the DMA circuit is to directly send the write request to the device without a prefetch operation by the processor to obtain ownership.

2. The processor of claim 1, wherein the coherence circuit comprises an address range decoder, and the DMA circuit is to access the address range decoder using the address of the write request to determine that the write request is directed to the device-attached memory.

3. The processor of claim 1, wherein the write request comprises a remote direct memory access request having an unset transaction layer processing hint.

4. The processor of claim 1, wherein in response to a determination that the address of the write request is directed to the system memory coupled to the processor, the DMA circuit is to store the data of the write request in the at least one cache memory.

5. The processor of claim 4, wherein the DMA circuit is to store the data of the write request in the at least one cache memory further in response to an allocating platform default setting.

6. The processor of claim 1, wherein the coherence circuit, in response to a use once indicator from the device for a second data, is to cause the processor to use the second data one time, and thereafter send a second write request comprising the second data to the device.

7. The processor of claim 6, wherein in response to a completion from the device for the second write request, the processor is to send a forward message to the device to cause the device to change a bias of the second data to a device bias.

8. The processor of claim 1, wherein the coherence circuit, in response to a third write request having an unset relaxed ordering indicator, is to order the third write request after one or more prior write requests.

9. A non-transitory machine-readable medium having stored thereon instructions, which if performed by a machine cause the machine to perform a method comprising:
   receiving, in a control circuit of a device coupled to a host processor via a first bus, an invalidation request for a first data block from the host processor;
   in response to the invalidation request, updating a bias for the first data block from a device bias to a temporary host bias, to prevent a device-initiated request to the first data block; and
   thereafter sending a completion message to the host processor comprising a use once indicator to cause the host processor to use the first data block one time and then to relinquish ownership of the first data block to the device.

10. The non-transitory machine-readable medium of claim 9, wherein the method further comprises:
    receiving, in the device, a write request for the first data block;
    in response to the write request, storing the first data block in a device-attached memory; and
    sending a second completion message to the host processor.

11. The non-transitory machine-readable medium of claim 10, wherein after sending the second completion message to the host processor, receiving a forward message from the host processor and in response to the forward message, updating the bias for the first data block to the device bias.

12. The non-transitory machine-readable medium of claim 11, wherein the method further comprises updating the bias for the first data block to the device bias without issuing a request for ownership to the host processor.

13. The non-transitory machine-readable medium of claim 9, wherein the method further comprises:

receiving, in the control circuit of the device, a second write request for a second data block, the second write request comprising a direct write request; and in response to the second write request, storing the second data block in the device-attached memory.

14. The non-transitory machine-readable medium of claim 9, wherein the first data block comprises remote direct memory access data from a first input/output device coupled to the device via the host processor and a network interface controller.

15. A system comprising:
a host processor having at least one core, at least one cache memory and a coherence circuit coupled to the at least one cache memory, wherein the coherence circuit comprises a direct memory access (DMA) circuit to receive a remote direct memory access (RDMA) write request, and based at least in part on an address of the RDMA write request, to directly send the RDMA write request to a device, wherein the RDMA write request has a relaxed ordering indicator associated therewith;
a host memory coupled to the host processor;
the device coupled to the host processor via a first bus, wherein in response to the RDMA write request, the device is to store data of the RDMA write request to a device-attached memory and to set a bias of the data to a device bias; and
the device-attached memory locally coupled to the device.

16. The system of claim 15, wherein the coherence circuit comprises an address range decoder, and the DMA circuit is to access the address range decoder using the address of the RDMA write request to determine that the write request is directed to the device-attached memory, wherein the system comprises a server platform having an allocating default setting.

17. The system of claim 16, wherein, in response to a second write request directed to the host memory coupled to the host processor, the host processor is to store second data of the second write request to the least one cache memory based on the allocating default setting.

18. The system of claim 15, wherein, in response to a second RDMA write request directed to the device-attached memory, the host processor is to send an invalidation message to the device, and in response to the invalidation message, the device is to send a use once response to the host processor to grant a temporary host bias for second data.

19. The system of claim 18, wherein the host processor, in response to the use once response, is to use the second data of the second RDMA write request one time, and thereafter send a write request to the device to cause the device to store the second data in the device-attached memory, and thereafter the host processor is to perform a self-invalidation of the second data to relinquish the temporary host bias.

* * * * *